(12) United States Patent
Unru et al.

(10) Patent No.: US 12,374,883 B2
(45) Date of Patent: Jul. 29, 2025

(54) METHOD FOR BALANCING VOLTAGES IN A DC GRID AND BALANCING UNIT FOR A DC GRID

(71) Applicant: SMA Solar Technology AG, Niestetal (DE)

(72) Inventors: Alexander Unru, Baunatal (DE); Marcel Kratochvil, Kassel (DE); Burkard Müller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 137 days.

(21) Appl. No.: 18/316,275

(22) Filed: May 12, 2023

(65) Prior Publication Data

US 2023/0283072 A1    Sep. 7, 2023

Related U.S. Application Data

(63) Continuation of application No. PCT/EP2021/081555, filed on Nov. 12, 2021.

(30) Foreign Application Priority Data

Nov. 12, 2020 (DE) ..................... 10 2020 129 921.4

(51) Int. Cl.
 *H02J 1/08* (2006.01)
 *G05F 1/613* (2006.01)
(52) U.S. Cl.
 CPC ............. *H02J 1/082* (2020.01); *G05F 1/613* (2013.01)
(58) Field of Classification Search
 CPC ............. H02J 1/08; H02J 1/082; G05F 1/613
 See application file for complete search history.

(56) References Cited

U.S. PATENT DOCUMENTS 3,646,428 A    2/1972  Torok
3,983,452 A *  9/1976  Bazin ..................... H03K 4/696
                                                    315/387

(Continued)

FOREIGN PATENT DOCUMENTS

CN    109149549 A    1/2019
DE    102005027081 A1    5/2006

(Continued)

OTHER PUBLICATIONS

International Search Report dated Feb. 17, 2022 for International Application No. PCT/EP2021/081555.

(Continued)

*Primary Examiner* — Harry R Behm
(74) *Attorney, Agent, or Firm* — Eschweiler & Potashnik, LLC

(57) ABSTRACT

The application describes a method for balancing voltages on a first and a second DC conductor in a DC grid using a balancing circuit with a first and second semiconductor switch connected in series between the first and second DC conductors, and a connection to a ground potential that is arranged between the first and second semiconductor switches. In the presence of an asymmetry in the voltages of the first and second DC conductors to ground potential, a compensation current is generated between at least one of the DC conductors ground potential via at least one of the semiconductor switches, with the asymmetry in the voltages being reduced by the compensation current (IA), with the voltages of the DC conductors to ground potential being balanced.

15 Claims, 8 Drawing Sheets

(56) References Cited

U.S. PATENT DOCUMENTS

| | | | | |
|---|---|---|---|---|
| 4,740,878 | A | * | 4/1988 | Carter .................... G05F 1/585 |
| | | | | 363/63 |
| 5,675,239 | A | * | 10/1997 | Kim ....................... G05F 1/613 |
| | | | | 323/273 |
| 6,738,277 | B2 | * | 5/2004 | Odell .................... H02J 7/0016 |
| | | | | 363/52 |
| 2004/0246042 | A1 | * | 12/2004 | Yang ....................... H02M 1/00 |
| | | | | 327/530 |
| 2007/0285102 | A1 | | 12/2007 | Muller |
| 2008/0197706 | A1 | | 8/2008 | Nielsen |
| 2011/0062962 | A1 | | 3/2011 | Wolf et al. |
| 2015/0207426 | A1 | * | 7/2015 | Santini ................. H02M 3/158 |
| | | | | 363/126 |
| 2017/0373510 | A1 | * | 12/2017 | Morita ............. H02M 3/33584 |

FOREIGN PATENT DOCUMENTS

| | | |
|---|---|---|
| DE | 102006014780 A1 | 10/2007 |
| DE | 102006022686 A1 | 11/2007 |
| DE | 102018115929 A1 | 1/2020 |

OTHER PUBLICATIONS

Dragicevic et al. "DC Microgrids—Park II: A Review of Power Architectures, Applications, and Standardization Issues", IEEE Transactions on Power Electronics, vol. 31, No. 5, May 1, 2016.

Li et al. "Investigation on the System Grounding Types for Low Voltage Direct Current Systems" 2103 IEEE Electricial Power & Energy Conference, Published Aug. 21, 2013.

"IEC 63112 ED1: Safety, functionally and classification of Photovoltaic Earth Fault Protection (PV EFP) equipment", Published Jun. 5, 2020.

\* cited by examiner

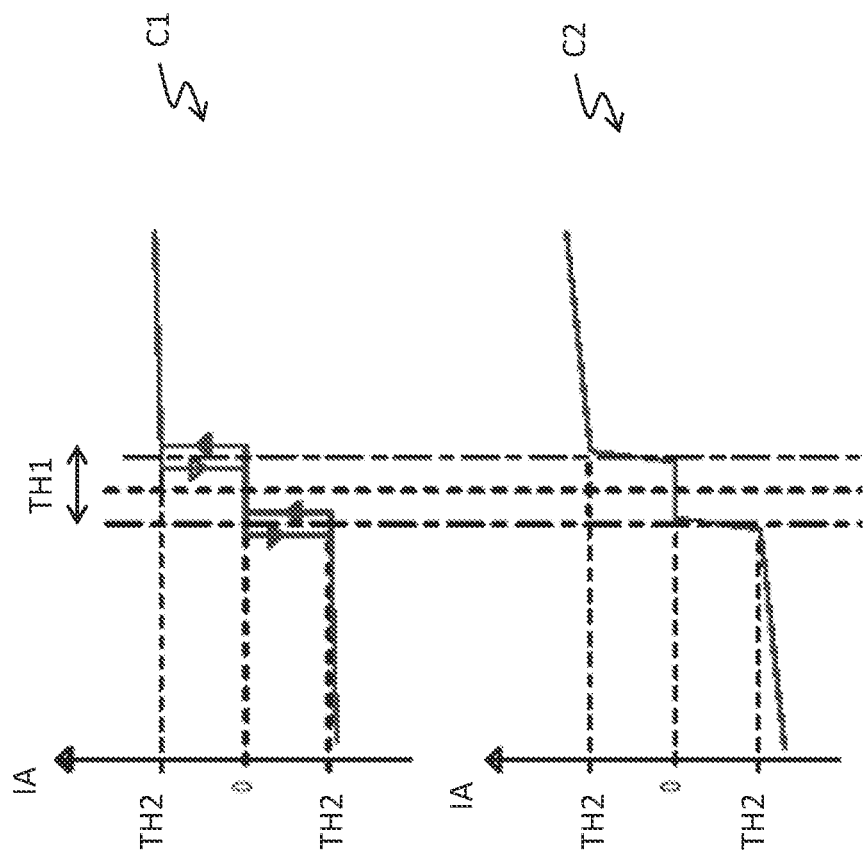

METHOD FOR BALANCING VOLTAGES IN A DC GRID AND BALANCING UNIT FOR A DC GRID

CROSS REFERENCE TO RELATED APPLICATIONS

This application is a continuation of International Patent Application Number PCT/EP2021/08155, filed on Nov. 12, 2021, which claims priority to German Patent Application number 10 2020 129 921.4, filed on Nov. 12, 2020, and is hereby incorporated by reference in its entirety.

FIELD

A method and a device that support simple and safe operation of a DC grid is disclosed.

BACKGROUND

A DC energy system comprises at least one energy source that makes available electric power in the form of DC current, that is to say a DC source, for example, a battery, a PV generator or a fuel cell, and at least one load that consumes electric power, for example, in the form of DC current, that is to say a DC sink, for example, a consumer, and connections between these electrical components. The DC energy system may comprise a DC grid or a DC bus where the electrical components are connected, and comprise further sources, stores and/or consumers. The transition between a DC bus with a few connected components, for example, just one source and one sink, and a DC grid with a large number of such components is fluid. In this application, the term DC grid is also understood to mean a DC bus.

Such a DC grid may be operated with or without grounding. Depending on the specific operating mode, different monitoring and protection mechanisms may be required by standards in the event of a ground fault.

An ungrounded DC grid, in which the potentials DC+ and DC− of the respective DC lines DCL+ and DCL− have no fixed reference to ground potential, has the advantage that any first ground fault in the DC grid, for example, an insulation fault along one of the DC lines, still does not lead to any harm. However, insulation monitoring is required in order to detect the occurrence of any fault and, if necessary, to be able to initiate countermeasures when a first ground fault occurs, for example, to switch off the energy source or to disconnect the energy source and/or the fault location from the DC grid.

In a grounded DC grid, the potentials DC+ and DC− have a defined reference to ground potential. Such a ground reference may be implemented, for example, by way of a resistive connection between the ground potential and one of the DC potentials DC+ or DC−.

A DC grid may be connected, via a power converter, to a further energy grid, for example, a further DC grid or an AC grid, for example, an AC supply grid, and exchange electric power with the further energy grid, for example, in order to support or recharge the DC source in the DC grid. The DC grid may in principle also be supplied permanently or at times completely with energy from the further energy grid via the power converter, wherein the energy source of the DC grid may be used to buffer power fluctuations if necessary.

If the further energy grid has grounding, for example, in the form of a grounded neutral conductor, and the power converter is designed to be transformerless, that is to say has no galvanic isolation between the AC and DC side, the DC grid may automatically be provided with a fixed ground reference, that is to say grounded, via the power converter. The specific position of the potentials of the DC grid relative to the ground reference is predefined in this case by the specifically used topology of the power converter. By way of example, on the DC side, the power converter may have a divided link circuit, the center tap, that is to say midpotential, of which is connected to a neutral conductor with a fixed ground reference, such that the DC potentials of the DC conductors in the link circuit are largely symmetrical about the ground potential. Such symmetry of the DC potentials has advantages in terms of system design.

In this respect, a DC grid that is not grounded per se likewise becomes a grounded grid through a connection to a grounded energy grid via a transformerless power converter. This may thus result in two operating states for such a DC grid: a "stand-alone" mode without grounding via a power converter and a grounded mode when connected to the grounded energy grid via a power converter. This should be taken into account when designing the system.

However, if a grounded DC grid is connected to a grounded AC grid, for example, via a power converter, this may result in such high, uncontrolled current flows between the grids that components of the power converter or components of the grids are damaged. This also applies if an insulation fault is present in a supposedly ungrounded DC grid.

In this application, the abbreviation DC stands for direct current or direct voltage and AC stands for alternating current or alternating voltage.

SUMMARY

The disclosure is directed to a method and a device that support simple and safe operation of a DC grid.

In a method for balancing voltages on a first DC conductor and a second DC conductor in a DC grid, in the presence of an asymmetry in the voltages of the first DC conductor to ground potential and of the second DC conductor to ground potential, a compensation current is generated between at least one of the DC conductors and ground potential. The balancing takes place by way of a balancing circuit or unit with a first semiconductor switch and a second semiconductor switch, which are connected in series between the first DC conductor and the second DC conductor, and a connection to the ground potential that is arranged between the first semiconductor switch and the second semiconductor switch. The compensation current, which is generated between at least one of the DC conductors and ground potential in the presence of an asymmetry in the voltages of the first DC conductor to ground potential and of the second DC conductor to ground potential, is generated via a respective one of the semiconductor switches, with the asymmetry in the voltages of the first DC conductor and the second DC conductor to ground potential being reduced by the compensation current. In one embodiment, the voltages of the DC conductors with respect to ground potential are balanced.

In the context of this application, symmetrical voltages mean that the absolute values of the DC voltages with respect to ground potential on both DC conductors are almost the same and have opposing polarity, that is to say are positive for one of the DC conductors and negative for the other of the DC conductors.

In one embodiment, the semiconductor switches may be bipolar transistors, for example, which are, for example, used as controllable resistors or current sources. In these embodiments, the compensation current flows as a result of the non-linearities of the semiconductors, since the semiconductor has a variable resistance as a function of an analog control signal at the control input of the semiconductors.

The semiconductor switches may also be, for example, switching transistors that are driven, for example, by a control circuit or unit, for example, in a binary manner, such that they have only two states. In such an embodiment, the driving takes place by way of a binary control signal that, depending on the design of the circuit, is provided, for example, by a control circuit or unit with appropriate regulation. The method is, for example, carried out on the control circuit or unit.

The method intervenes when an asymmetry in the voltages is present and makes it possible to balance the DC voltages in different operating states of the DC grid. These include, for example, an AC-coupled mode, in which the DC grid is galvanically connected to a grounded AC supply grid, for example, via a transformerless power converter, and is supplied at least predominantly with electric power from the AC supply grid, as well as a "stand-alone" mode, in which the DC grid is galvanically isolated from the AC supply grid. If the voltages in the DC grid are symmetrical, which may result, for example, through an indirect ground reference via the power converter from the grounded AC supply grid, then no intervention is made in this grounding and symmetry. This means that the DC grid can be operated flexibly both in "stand-alone" mode, for example, with electric power from the battery, and in grid-tied mode with a given ground reference from an AC supply grid via the power converter. The DC-side protection concept for a grounded DC grid does not have to be changed here. This simplifies the system design by ensuring that, during operation of the DC grid, no voltages to ground that are significantly above half the total DC voltage occur.

In one embodiment, in an ungrounded DC grid without balancing of the DC voltages, the voltage to ground potential may encompass the full system voltage if one of the DC potentials is close to the ground potential. The insulation in DC consumers then has to be, or has to be from the outset, designed for the maximum occurring DC voltages to ground potential. The method thus simplifies the system design, since it is possible to balance the DC voltages (within certain limits) and it is thus possible to ensure that the maximum occurring DC voltages to ground potential are limited to approximately half the DC link circuit voltage or the DC grid is switched off if necessary.

In one embodiment of the method, the compensation current is generated via the at least one semiconductor switch when the asymmetry in the voltages exceeds a predefinable first threshold value. In such a method, the balancing circuit or unit intervenes only when the asymmetry in the two DC voltages exceeds the first threshold value. When designing the system, it may thus be taken into account that, for example, smaller asymmetries may be harmless for the system or may even be desirable due to the system, and it may therefore be possible for initially no intervention to be needed.

Such an activation threshold, that is to say the implementation of the first threshold value, for the compensation current may be achieved, for example, through suitable selection and design of the electrical and/or electronic components of the balancing circuit or unit, for example, by using Zener diodes to drive the semiconductor switches when the first threshold value is reached. This makes it possible for a compensation current to flow through the balancing circuit or unit to ground potential only starting from a certain asymmetry. This may be advantageous if, for example, the power converter is configured as a bidirectional, three-phase inverter and a zero-sequence system is modulated onto the DC lines on the DC side, as is the case, for example, when using a flat-top modulation. Specifically, this leads to the DC potential not being constant, but rather the position of the DC voltages being modulated at the grid frequency through the type of regulation of the bridge circuit of the power converter. There is thus a kind of system-induced "modulated asymmetry". In this respect, the use of an activation threshold may prevent the method from working against a system behavior desired by the power converter.

In one embodiment, the method comprises an act whereby, as an alternative or in addition, the asymmetry in the voltages is determined by the control circuit or unit. This embodiment is advantageous when the semiconductor switches are, for example, switching transistors that are driven by the control circuit or unit, for example, switched on and off using binary. The activation threshold for the compensation current, that is to say the first threshold value, is determined here by the control circuit or unit, and the semiconductor switches are driven via drive signals such that a compensation flows through the balancing circuit or unit to ground only starting from a certain asymmetry.

In one embodiment of the method, the size of the compensation current is monitored by the control circuit or unit. If the compensation current exceeds a predefinable second threshold value, a switch-off signal is generated and is output. The control circuit or unit, for example, generates the switch-off signal and outputs it. In such a case, the asymmetry in the DC voltages is excessively great, which may indicate, for example, a significant insulation fault in the DC grid, and should no longer be compensated for by the method.

In further embodiments of the method, the outputting of the switch-off signal disconnects the DC grid from an electrical energy store and/or a DC source. For this case of the excessively high compensation current, it is made possible to switch off the DC grid for safety reasons.

A balancing circuit or unit for a DC grid with a first DC conductor and a second DC conductor, wherein at least one DC load and an electrical energy store and/or a DC source are connectable between the first DC conductor and the second DC conductor, has a first semiconductor switch and a second semiconductor switch. The first semiconductor switch and the second semiconductor switch are connected in series between the first DC conductor and the second DC conductor. There is a connection to ground potential between the first semiconductor switch and the second semiconductor switch. The balancing circuit or unit is configured such that at least one semiconductor switch is operated such that, in the presence of an asymmetry in the voltages of the first DC conductor and the second DC conductor to ground potential, a compensation current flows between at least one of the DC conductors and ground potential via the at least one semiconductor switch, with the asymmetry in the voltages of the first DC conductor and the second DC conductor to ground potential being reduced by the compensation current, with the voltages with respect to ground potential being balanced.

In various embodiments of the balancing circuit or unit, the first semiconductor switch and the second semiconductor switch comprise transistors. The balancing circuit or unit may in one embodiment comprise bipolar transistors as semiconductor switches, these being used as controllable resistors or current sources and generating the compensation current at their terminals under certain voltage conditions. In these embodiments, the compensation current flows as a result of the non-linearities of the semiconductors, since the semiconductor has a variable resistance as a function of an analog control signal at the control input of the semiconductors. As an alternative or in addition, the balancing circuit or unit may comprise switching transistors as semiconductor switches. The switching transistors may be actuated actively, for example, by a control circuit or unit. The actuation takes place in this case by way of, for example, a digital control signal that is generated by the control circuit or unit on which the above-described method is carried out.

In one embodiment of the balancing circuit or unit, the control terminals of the transistors are connected to a center tap of a series connection of two ohmic resistors arranged between the first DC conductor and the second DC conductor, wherein the series connection of the ohmic resistors forms a voltage divider. In the event of an asymmetry in the voltages on the DC conductors, the potential of the center tap shifts such that the control terminal of one of the transistors is driven and a compensation current is generated via this transistor. This embodiment is suitable for bipolar transistors, for example.

In one embodiment of the balancing circuit or unit, a Zener diode is arranged between the center tap of the voltage divider and the control terminals of the transistors. This Zener diode makes it possible to ensure that small asymmetries in the DC voltages do not affect the transistors, but rather that a voltage is present at the control inputs of the transistors only when a first threshold value is reached. The first threshold value depends in this embodiment on the breakdown voltage of the Zener diode. This embodiment is suitable for bipolar transistors, for example.

The described balancing circuit or unit thus makes it possible to implement the first threshold value, such that a compensation current flows through the balancing circuit or unit to ground potential only starting from a certain asymmetry. This may be advantageous if, for example, the power converter is configured as a bidirectional, three-phase inverter and a zero-sequence system is modulated onto the DC lines on the DC side, as is the case, for example, when using a flat-top modulation. Specifically, this leads to the DC potential not being constant, but rather the position of the DC voltages being modulated at the grid frequency through the type of regulation of the bridge circuit of the power converter. There is thus a kind of system-induced "modulated asymmetry". In this respect, implementing the first threshold value for activating the generation of the compensation current makes it possible to prevent the balancing circuit or unit from working against a system behavior desired by the power converter.

In one embodiment of the balancing circuit or unit with a Zener diode between the center tap of the voltage divider and the control terminals of the transistors, an ammeter and, in series therewith, a further Zener diode are arranged between the control terminals of the transistors and ground potential, wherein a control circuit or unit uses the ammeter to detect a current flow through the further Zener diode and generates and outputs a switch-off signal when a current flows through the further Zener diode, which indicates that the further Zener diode has become conductive and thus that a second threshold value for the compensation current has been exceeded. This makes is possible to detect a compensation current that exceeds the second threshold value. This means that the DC grid can be switched off if a required compensation current becomes excessively large, that is to say the asymmetry in the DC voltages is excessively great.

In one embodiment of the balancing circuit or unit, a first voltmeter is arranged in parallel with the first semiconductor switch and a second voltmeter is arranged in parallel with the second semiconductor switch, wherein the first voltmeter is configured to measure the voltage of the first DC conductor to ground potential and the second voltmeter is configured to measure the voltage of the second DC conductor to ground potential. Using the voltmeter, the control circuit or unit can, for example, monitor an asymmetry in the DC voltages, that is to say of the first DC conductor to ground potential and of the second DC conductor to ground potential. If the asymmetry in the DC voltages becomes excessively great, that is to say exceeds for example the first threshold value, then a switch-off signal is generated and output by the control circuit or unit. The switch-off signal is able, for example, to drive switches that disconnect a DC source or a battery from the DC grid.

In one embodiment of the balancing circuit or unit, the first semiconductor switch and the second semiconductor switch are connected as part of a charge pump circuit. The charge pump circuit comprises a first series connection of four semiconductor switches, a second series connection of four diodes and a third series connection of two capacitors. The series connections are each connected between the DC conductors and their center taps are connected to one another. The charge pump circuit has, in one embodiment, a resonant circuit made up of a coil and a capacitor, wherein the series connection of the capacitors forms a link circuit into which charge is pumped from one of the DC conductors. Pumping the charge relieves the compensation current, so to speak, and supports the reduction in the asymmetry in the DC voltages.

In one embodiment, the balancing circuit or unit is configured such that a further DC grid can be operated between the connection to ground potential, which is arranged between the first semiconductor switch and the second semiconductor switch, and the first DC conductor or the second DC conductor. The connection point to the ground potential may thus be used as an additional busbar of the DC grid, on which consumers are able to be operated at half rated voltage, for example.

In one embodiment of the balancing circuit or unit, the control circuit or unit is configured to drive the at least one semiconductor switch on the basis of the asymmetry in the DC voltages. Driving the semiconductor switches appropriately generates the compensation current, which is suitable for reducing the determined asymmetry in the DC voltages and for balancing them. This embodiment is suitable for switching transistors, for example.

The balancing circuit or unit may thus make available a dedicated balancing circuit that makes available a (mid-) potential between the two DC potentials that can be connected to ground potential via the semiconductor switches if necessary in order to balance the voltages. The balancing circuit or unit may operate in several stages: no balancing in the event of small asymmetry, balancing for as long as possible or as long as is sensible, and switching off the DC grid when needed.

An insulation resistance of the DC grid with respect to ground potential in this case changes depending on the asymmetry in the voltages. In the case of symmetrical DC voltages, it has a high ohmic resistance, and it becomes smaller as asymmetry increases. If it becomes excessively small, the DC grid may be switched off by disconnecting the DC source or the battery.

The application furthermore relates to a DC grid with a balancing circuit or unit as described above.

The application also relates to an electrical system comprising such a DC grid and a power converter for transferring power between an AC side of the power converter and a DC side of the power converter, wherein the AC side of the power converter is connectable to a grounded three-phase AC supply grid and the DC side of the power converter is connected to the DC grid.

The DC grid may optionally also be operated without a power converter. This may encompass the case whereby the power converter is switched off or is not connected to the DC grid at all. The DC grid may optionally be operated with a galvanically isolating power converter or a transformerless power converter. In each of these cases, the balancing circuit may achieve balancing of the DC voltages as required and at the same time if necessary grounding of the DC grid. The balancing circuit is thereby able to implement an effective protection concept for the DC grid. The design of the insulation of the lines within the DC grid may be sufficient for half the system voltage to ground potential, since the balancing circuit or unit makes it possible to achieve the effect whereby the DC voltages in the DC grid are essentially symmetrical about ground potential. It may additionally be possible to dispense with the measurement of the insulation resistance as part of the protection concept, as a result of which the protection concept may be simplified.

On the DC grid side, it is possible to use normal consumers for DC grids that are not necessarily designed for the occurrence of the full system voltage to ground. On the AC supply grid side, it is possible to use AC consumers that are common for grounded AC grids. The insulation resistance of the DC grid may be determined using a measuring circuit. This is able to detect symmetrical faults if the operating voltage of the measuring circuit remains below the activation threshold, that is to say the first threshold value, of the balancing circuit.

BRIEF DESCRIPTION OF THE FIGURES

The disclosure is explained in more detail below with the aid of figures.

FIG. 8 schematically shows exemplary course of compensation currents.

DETAILED DESCRIPTION

Figure 1:
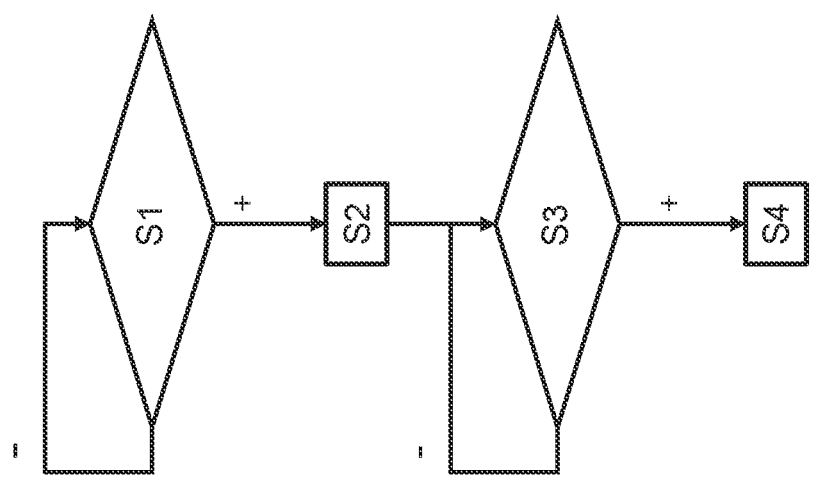
FIG. 1 schematically shows one embodiment of a method.

FIG. 1 illustrates one embodiment of a method. The method serves to balance voltages on a first DC conductor DC+ and a second DC conductor DC− each to ground potential in a DC grid 14 (FIGS. 3 to 7). The method is carried out by way of a balancing circuit or unit 20, 30, 40, 50, 60, examples of which are illustrated in FIGS. 3 to 7. The balancing circuit or unit comprises a first semiconductor switch T1, T3, T5, T7, T9 and a second semiconductor switch T2, T4, T6, T8, T12, which are connected in series between the first DC conductor DC+ and the second DC conductor DC−. A connection to a ground potential PE is present between the first semiconductor switch T1, T3, T5, T7, T9 and the second semiconductor switch T2, T4, T6, T8, T12.

In act S1, in the presence of an asymmetry in the voltages of the first DC conductor DC+ to ground potential PE and of the second DC conductor DC− to ground potential PE, a transition to act S2 takes place via the branch "+" (YES at S1). In the absence of the asymmetry, branch "−" (NO at S1), act S1 continues to be carried out. In one embodiment of the balancing circuit or unit comprising a control circuit or unit 22, act S1 may, for example, take place by virtue of the control circuit or unit determining the presence of an asymmetry in the voltages. In one embodiment of the balancing circuit or unit without a control circuit or unit 22, the asymmetry may, for example, be recognized through the circuit design in hardware.

Figure 2:
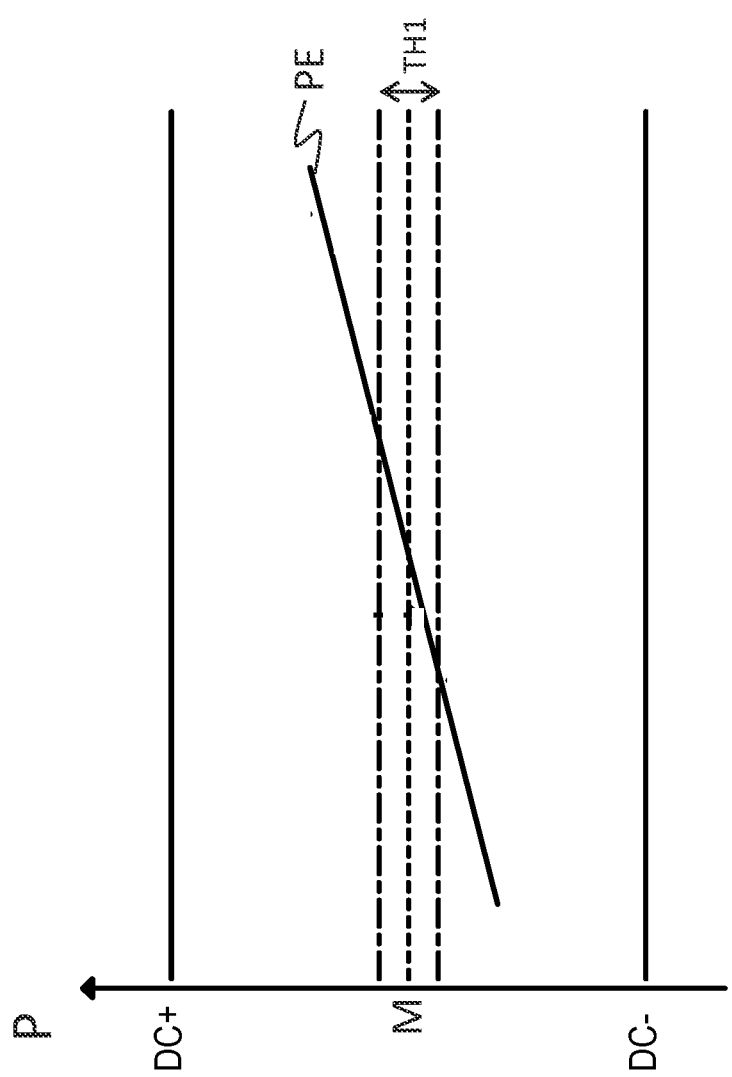
FIG. 2 schematically shows one example of a course of the ground potential in relation to the DC voltages.

Optionally, at act S1, the branch "+" may be taken only if the asymmetry in the voltages exceeds a first threshold value TH1 (FIG. 2). This may also be implemented in terms of circuitry in hardware or by way of the control circuit or unit 22.

At act S2, a compensation current IA (FIG. 8) is generated between at least one of the DC conductors DC+, DC− and ground potential PE via at least one of the semiconductor switches T1, T2, T3, T4, T5, T6, T7, T8, T9, T12, with the asymmetry in the voltages of the first DC conductor and the second DC conductor DC+, DC− to ground potential PE being reduced by the compensation current IA, with the voltages of the DC conductors DC+, DC− with respect to ground potential PE being balanced.

In one embodiment of the balancing circuit or unit comprising a control circuit or unit 22, in which act S1 takes place, for example, by virtue of the control circuit or unit ascertaining the presence of an asymmetry in the voltages, the control circuit or unit 22 may, for example, in act S2, drive the semiconductor switches T5, T6, T7, T8, T9, T12 so as to generate the compensation current. In one embodiment of the balancing circuit or unit without a control circuit or unit 22, in which the asymmetry is recognized in act S1, for example, through the circuit design in hardware, the semiconductor switches T1, T2, T3, T4 may, for example, be driven via the hardware circuit.

In act S3, branch "+" (YES at S3) is taken if the compensation current IA generated in step S2 exceeds a second threshold value TH2 (FIG. 8). If the second threshold value TH2 is not exceeded, branch "−" (NO at S3), act S3 continues to be carried out. Act S3 may also be implemented in terms of circuitry in hardware or by way of the control circuit or unit 22.

A switch-off signal for the DC grid 14 is generated at act S4. This occurs since an excessive high compensation current IA and/or an excessively large asymmetry was recognized in step S3. The switch-off signal is preferably generated by the control unit 22 and disconnects a battery 42 from the DC grid 14 via DC switches 28, for example.

FIG. 2 illustrates example courses of potentials P in a DC grid. The ground potential PE is illustrated in relation to the DC voltages on the DC conductors DC+, DC−. M denotes the mid-potential in the midpoint between the two potentials of DC+ and DC−. If the mid-potential M corresponds exactly to the ground potential PE, then the DC voltages DC+, DC− are symmetrical about the ground potential PE. This is the desired state. The ground potential PE may lie outside the midpoint M between the potentials of DC+ and DC−. In such cases, the DC voltages are asymmetric, that is to say the absolute value of the voltage between DC+ and PE deviates more or less significantly from the absolute value of the voltage between DC− and PE.

TH1 denotes the first threshold value. If the voltages DC+, DC− are in relation to ground potential PE such that PE lies within the band defined by TH1, then the asymmetry in the DC voltages is comparatively small. In such an instance, the asymmetry in the DC voltages falls below the first threshold value TH1. In this case, in one embodiment, no compensation current is generated; the resistance of the balancing circuit and the insulation resistance of the DC grid to ground potential are high. For the method illustrated in FIG. 1, this may mean that act S1 continues to be carried out.

If the asymmetry in the DC voltages reaches a value that corresponds to a position of the ground potential PE at the edge of the band defined by TH1, then, in the method of FIG. 1, act S2 may be carried out and a compensation current IA may be generated. The compensation current IA is intended to ensure that the position of the ground potential PE continues to be kept at the edge or within the tolerance band TH1. In this respect, the DC voltages are kept approximately symmetrical about the ground potential PE, with a certain asymmetry being permitted, but with excessively high voltages to ground potential PE on one of the DC conductors DC+ or DC− being avoided.

In one embodiment, the compensation current IA at the edges of the tolerance band TH1, in particular at the limit value of the tolerance band TH1, changes sharply in the event of a small voltage change, such that asymmetries in the DC voltages are compensated for dynamically and the asymmetry is kept at the first threshold value TH1. This may be carried out by the control circuit or unit 22 or is achieved through strongly non-linear behavior of the analog circuits according to FIGS. 4-7.

The aim is to keep the position of PE close to the tolerance band TH1. If this is not possible, the compensation current increases sharply and the compensation current and/or the asymmetry reaches the second threshold value TH2. This corresponds, for example, in the method of FIG. 1 to act S3, in which, if the second threshold value TH2 is exceeded by the compensation current IA, a switch-off signal is generated at act S4. The switch-off signal disconnects a battery 42 from the DC grid.

FIGS. 3 to 7 schematically illustrate embodiments of balancing circuits or units 20, 30, 40, 50, 60 as components of electrical systems. Similar or identical elements are provided with the same reference signs in FIGS. 3 to 7.

Figure 3:
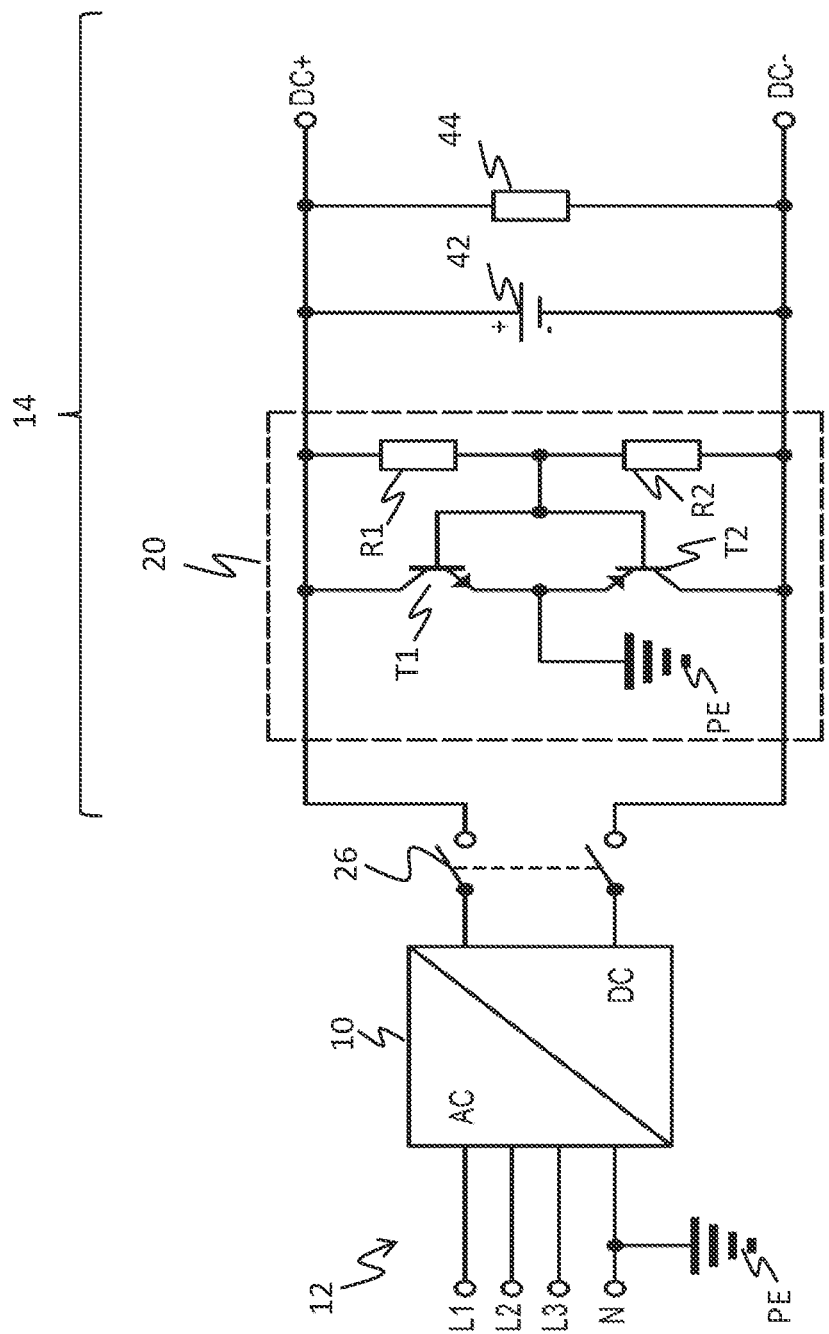
FIG. 3 schematically shows an electrical system comprising one embodiment of a balancing circuit.

FIG. 3 schematically illustrates one embodiment of an electrical system. A three-phase AC supply grid 12 grounded at the ground potential PE is connected on the AC side of a power converter 10. A DC grid 14 is connected on the DC side. The DC grid 14 has a battery 42 and a load 44 that are connected between a first DC line or conductor DC+ and a second DC line or conductor DC−. The load 44 may, for example, comprise one or more consumers, such as, for example, a machine, an industrial plant, or even an electrolyzer. The DC grid 14 is connectable to the power converter 10 via circuit breakers 26. The power converter 10 is, in one embodiment, designed to be transformerless, that is to say that its AC side and its DC side are galvanically coupled at least during operation. As a result, the DC grid 14 can be grounded via the AC supply grid, provided that both are connected to the power converter 10.

The balancing circuit or unit 20 comprises a first semiconductor switch T1 and a second semiconductor switch T2, which are, in one embodiment, in the form of bipolar transistors and are connected in series between the first DC conductor and the second DC conductor DC+, DC−. A series connection of two resistors R1, R2 is connected between the first DC conductor DC+ and the second DC conductor DC−, these resistors forming a voltage divider and, in one embodiment, having identical resistance values. A center tap of the voltage divider is connected to the control terminal of the first semiconductor switch T1 and to the control terminal of the second semiconductor switch T2. A connection to ground potential PE is arranged between the first semiconductor switch T1 and the second semiconductor switch T2.

The balancing circuit or unit 20 is configured such that at least one of the semiconductor switches T1, T2 is operated such that, in the presence of an asymmetry in the voltages of the first DC conductor and the second DC conductor DC+, DC− to ground potential PE, a compensation current IA flows between at least one of the DC conductors DC+, DC− and ground potential PE via the at least one semiconductor switch T1, T2. This is achieved in that, in the presence of an asymmetry in the voltages, a potential shift of the center tap of the voltage divider occurs, such that a voltage with respect to ground potential PE is present at the control terminals of the semiconductor switches T1, T2. Depending on the direction of the asymmetry, this means that one of the semiconductor switches T1, T2 changes its resistance. As a result, this respective semiconductor switch T1, T2 is driven and establishes a conductive connection between one of the DC lines DC+, DC− and ground potential PE, wherein the resistance of the semiconductor switch T1, T2 in question becomes smaller the greater the asymmetry and thus the voltage at its control input with respect to ground potential PE. A compensation current IA flows through this conductive connection between one of the DC lines DC+, DC− and ground potential PE, by way of which the asymmetry in the voltages of the first DC conductor and the second DC conductor DC+, DC− to ground potential PE is reduced or at least kept the same. In one embodiment, the voltages of the DC conductors DC+, DC− with respect to the ground potential PE may be balanced.

Figure 4:
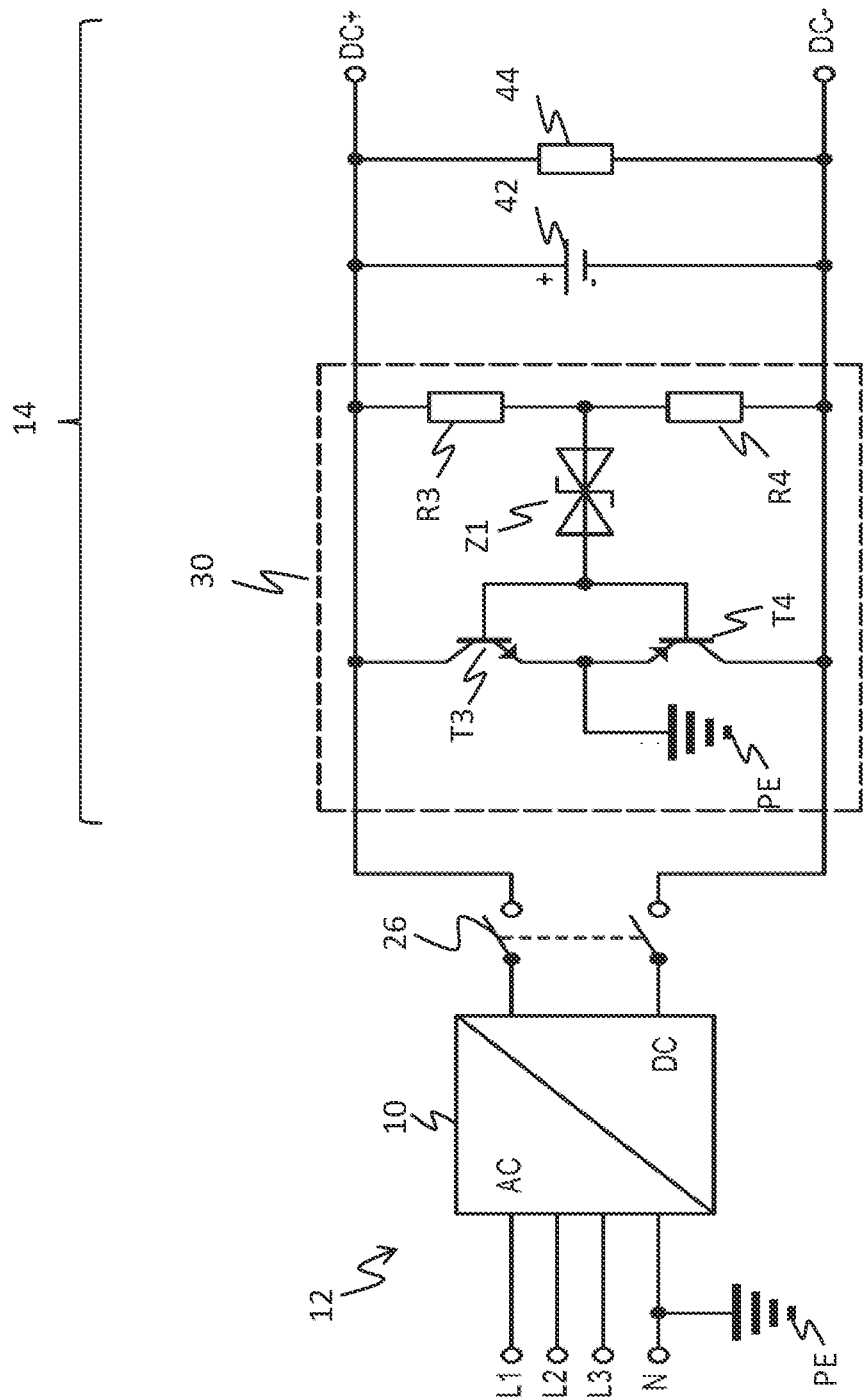
FIG. 4 schematically shows an electrical system comprising one embodiment of a balancing circuit with a Zener diode.

FIG. 4 schematically illustrates one embodiment of the electrical system according to FIG. 3 with a Zener diode Z1 for implementing the first threshold value TH1. A three-phase AC supply grid 12 grounded at the ground potential PE is connected on the AC side of a power converter 10. A DC grid 14 is connected on the DC side. The DC grid 14 has a battery 42 and a load 44 that are connected between a first DC line or conductor DC+ and a second DC line or conductor DC−. The load 44 may, for example, comprise one or more consumers, such as, for example, a machine, an industrial plant, or even an electrolyser. The DC grid 14 is connectable to the power converter 10 via circuit breakers 26.

The balancing circuit or unit 30 comprises a first semiconductor switch T3 and a second semiconductor switch T4, which are, in one embodiment, in the form of bipolar transistors and are connected in series between the first DC conductor and the second DC conductor DC+, DC−. Two resistors R3, R4 are connected in series between the first DC conductor DC+ and the second DC conductor DC− and form, for example, a symmetrical voltage divider. A center tap between the two resistors R3, R4 is connected to the control terminal of the first semiconductor switch T3 and to the control terminal of the second semiconductor switch T4 via a Zener diode Z1. A connection to ground potential PE is arranged between the first semiconductor switch T3 and the second semiconductor switch T4.

The balancing circuit or unit 30 is configured such that at least one semiconductor switch T3, T4 is operated such that, in the presence of an asymmetry in the voltages of the first DC conductor and the second DC conductor DC+, DC− to ground potential PE that reaches a first threshold value TH1, a compensation current IA flows between at least one of the DC conductors DC+, DC− and ground potential PE via the at least one semiconductor switch T3, T4. This is achieved in that, in the presence of an asymmetry in the voltages that is greater than the first threshold value TH1, a voltage is present at the Zener diode Z1 that exceeds the breakdown voltage of the Zener diode Z1. As a result, the Zener diode Z1 becomes conductive, such that a voltage is present at the control terminals of the semiconductor switches T3, T4. Depending on the direction of the asymmetry, this means that one of the semiconductor switches T3, T4 changes its resistance. As a result, this respective semiconductor switch T3, T4 is driven and establishes a conductive connection between one of the DC lines DC+, DC− and ground potential PE, wherein the resistance of the semiconductor switch T1, T2 in question becomes smaller the greater the asymmetry and thus the voltage at its control input with respect to ground potential PE. A compensation current IA flows through this conductive connection between one of the DC lines DC+, DC− and ground potential PE, by way of which the asymmetry in the voltages of the first and second DC conductor DC+, DC− to ground potential PE is reduced or at least kept the same. In particular, the voltages of the DC conductors DC+, DC− with respect to the ground potential PE may be balanced. The circuit is in this case designed such that the breakdown voltage of the Zener diode Z1 is selected such that the respective semiconductor switch T3, T4 is driven and the compensation current IA is generated only when the asymmetry in the DC voltages reaches or exceeds the first threshold value TH1.

Figure 5:
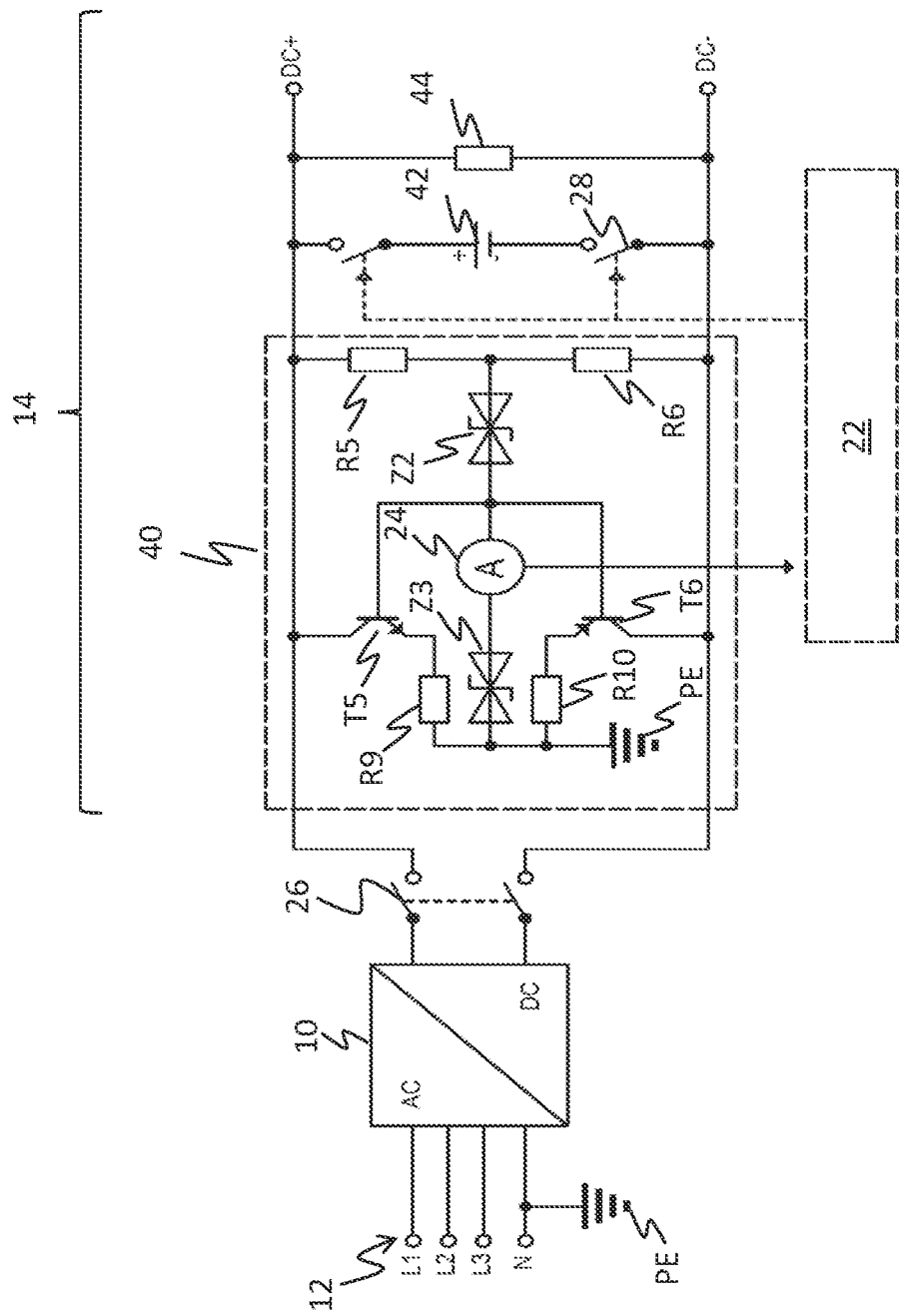
FIG. 5 schematically shows an electrical system comprising one embodiment of a balancing circuit with two Zener diodes.

FIG. 5 schematically illustrates one embodiment of the electrical system according to FIG. 4 with two Zener diodes. A three-phase AC supply grid 12 grounded at the ground potential PE is connected on the AC side of a power converter 10. A DC grid 14 is connected on the DC side. The DC grid 14 has a battery 42 and a load 44 that are connected between a first DC line or conductor DC+ and a second DC line or conductor DC−. The load 44 may, for example, comprise one or more consumers, such as, for example, a machine, an industrial plant, or even an electrolyzer. The DC grid 14 is connectable to the power converter 10 via circuit breakers 26.

The balancing circuit or unit 40 comprises a first semiconductor switch T5 and a second semiconductor switch T6, which comprise, in one embodiment, bipolar transistors and are connected in series between the first DC conductor and the second DC conductor DC+, DC−. Two resistors R5, R6 are connected in series between the first DC conductor DC+ and the second DC conductor DC− and form, for example, a symmetrical voltage divider. A center tap between the two resistors R5, R6 is connected to the control terminal of the first semiconductor switch T5 and to the control terminal of the second semiconductor switch T6 via a Zener diode Z2. Two resistors R9, R10 are connected in series between the first semiconductor switch T5 and the second semiconductor switch T6 and form, for example, a symmetrical voltage divider. A connection to ground potential PE is arranged between the resistor R9 and the resistor R10. The midpoint between the resistors R9 and R10 is also connected to the control terminals of the first and the second semiconductor switch T5, T6, and thus also to the Zener diode Z2, via a further Zener diode Z3 and an ammeter 24 connected in series therewith. The Zener diode Z2, the ammeter 24 and the further Zener diode Z3 are thus connected in series between the center tap between R5 and R6 and ground potential PE.

The balancing circuit or unit 40 is configured such that at least one semiconductor switch T5, T6 is operated such that, in the presence of an asymmetry in the voltages of the first DC conductor and the second DC conductor DC+, DC− to ground potential PE that reaches a first threshold value TH1, a compensation current IA flows between at least one of the DC conductors DC+, DC− and ground potential PE via R9 or R10 and via the at least one semiconductor switch T5, T6. This is achieved in that, in the presence of an asymmetry in the voltages that is greater than the first threshold value TH1, a voltage is present at the Zener diode Z2 that exceeds the breakdown voltage of the Zener diode Z2. As a result, the Zener diode Z2 becomes conductive, such that a voltage is present at the control terminals of the semiconductor switches T5, T6. Depending on the direction of the asymmetry, this means that one of the semiconductor switches T5, T6 changes its resistance. As a result, this respective semiconductor switch T5, T6 is driven and establishes a conductive connection between one of the DC lines DC+, DC− and ground potential PE via one of the resistors R9, R10, wherein the resistance of the semiconductor switch T5, T6 in question becomes smaller the greater the asymmetry and thus the voltage at its control input with respect to ground potential PE. A compensation current IA flows through this conductive connection between one of the DC lines DC+, DC− and ground potential PE, by way of which the asymmetry in the voltages of the first DC conductor and the second DC conductor DC+, DC− to ground potential PE is reduced or at least kept the same. In particular, the voltages of the DC conductors DC+, DC− with respect to the ground potential PE may be balanced. The circuit is in this case configured such that the breakdown voltage of the Zener diode Z2 is selected such that the respective semiconductor switch T5, T6 is driven and the compensation current IA is generated only when the asymmetry in the DC voltages reaches or exceeds the first threshold value TH1.

If the compensation current IA becomes so great that a voltage is present at the further Zener diode Z3 that reaches the breakdown voltage thereof, then a current flows through the Zener diode Z2, the ammeter 24 and the further Zener diode Z3. The circuit is in this case designed such that the breakdown voltage of the further Zener diode Z3 is selected such that it becomes conductive when the compensation current IA or the asymmetry associated therewith reaches the second threshold value TH2. The control circuit or unit 22 may thus use the ammeter 24 to detect that a current is flowing through the Zener diode Z2 and the further Zener diode Z3. If such a current is flowing, the compensation current IA or the asymmetry has reached the second threshold value TH2 and the control circuit or unit may generate a switch-off signal. In the illustrated embodiment, the switch-off signal may act on the DC switches 28 and disconnect the battery 42 from the DC grid 14. As an alternative or in addition, the switch-off signal may act on the circuit breakers 26 and disconnect the power converter 10 from the DC grid 14. The supply of electric power to the DC grid 14 from the battery 42 and/or via the power converter 10 is thus switched off.

Figure 6:
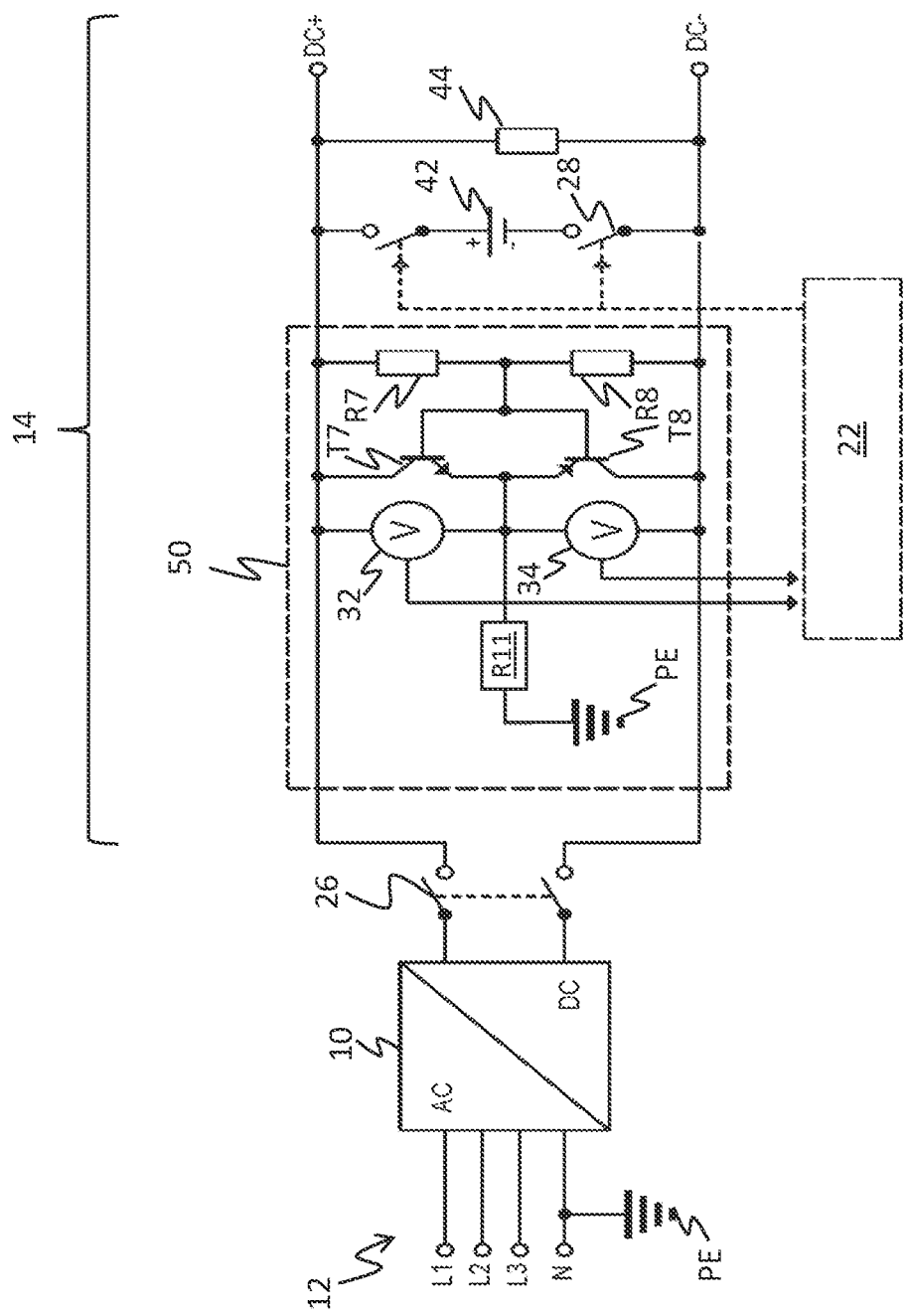
FIG. 6 schematically shows an electrical system comprising one embodiment of a balancing circuit with two voltmeters.

FIG. 6 schematically illustrates one embodiment of the electrical system according to FIG. 3 with two voltmeters 32, 34. A three-phase AC supply grid 12 grounded at the ground potential PE is connected on the AC side of a power converter 10. A DC grid 14 is connected on the DC side. The DC grid 14 has a battery 42 and a load 44 that are connected between a first DC line or conductor DC+ and a second DC line or conductor DC−. The load 44 may, for example, comprise one or more consumers, such as, for example, a machine, an industrial plant, or even an electrolyser. The DC grid 14 is connectable to the power converter 10 via circuit breakers 26.

The balancing circuit or unit 50 comprises a first semiconductor switch T7 and a second semiconductor switch T8, which comprise, in one embodiment, bipolar transistors and are connected in series between the first DC conductor and the second DC conductor DC+, DC−. A series connection of two resistors R7, R8 is connected between the first DC conductor DC+ and the second DC conductor DC−, these resistors, for example, forming a symmetrical voltage divider. A center tap between the two resistors R7, R8 is connected to the control terminals of the semiconductor switches T7, T8. A connection to ground potential PE is arranged between the first semiconductor switch T7 and the second semiconductor switch T8 via a resistor R11. A first voltmeter 32 is connected in parallel with the first semiconductor switch T7. A second voltmeter 34 is connected in parallel with the second semiconductor switch T8. Both voltmeters 32, 34 are connected to the control circuit or unit 22.

The balancing circuit or unit 50 is configured such that at least one semiconductor switch T7, T8 is operated such that, in the presence of an asymmetry in the voltages of the first DC conductor and the second DC conductor DC+, DC− to ground potential PE, a compensation current IA flows between at least one of the DC conductors DC+, DC− and ground potential PE via the resistor R11 and via the at least one semiconductor switch T7, T8. This is achieved in that, in the presence of an asymmetry in the voltages, a potential shift of the center tap of the voltage divider occurs, such that a voltage with respect to ground potential is present at the control terminals of the semiconductor switches T7, T8. Depending on the direction of the asymmetry, this means that one of the semiconductor switches T7, T8 changes its resistance. As a result, this respective semiconductor switch T7, T8 is driven and establishes a conductive connection between one of the DC lines DC+, DC− and ground potential PE, wherein the resistance of the semiconductor switch T7, T8 in question becomes smaller the greater the asymmetry and thus the voltage at its control input with respect to ground potential PE. A compensation current IA flows through this conductive connection between one of the DC lines DC+, DC− and ground potential PE, by way of which the asymmetry in the voltages of the first DC conductor and the second DC conductor DC+, DC− to ground potential PE is reduced or at least kept the same. In one example, the voltages of the DC conductors DC+, DC− with respect to the ground potential PE may be balanced.

If the asymmetry in the DC voltages becomes so great that the second threshold value TH2 is reached or exceeded, then the control circuit or unit 22 can detect this using the voltmeters 32, 34 and generate a switch-off signal. In the illustrated embodiment, the switch-off signal may act on the DC switches 28 and disconnect the battery 42 from the DC grid 14. As an alternative or in addition, the switch-off signal may act on the circuit breakers 26 and disconnect the power converter 10 from the DC grid 14. The supply of electric power to the DC grid 14 from the battery 42 is thus switched off.

Figure 7:
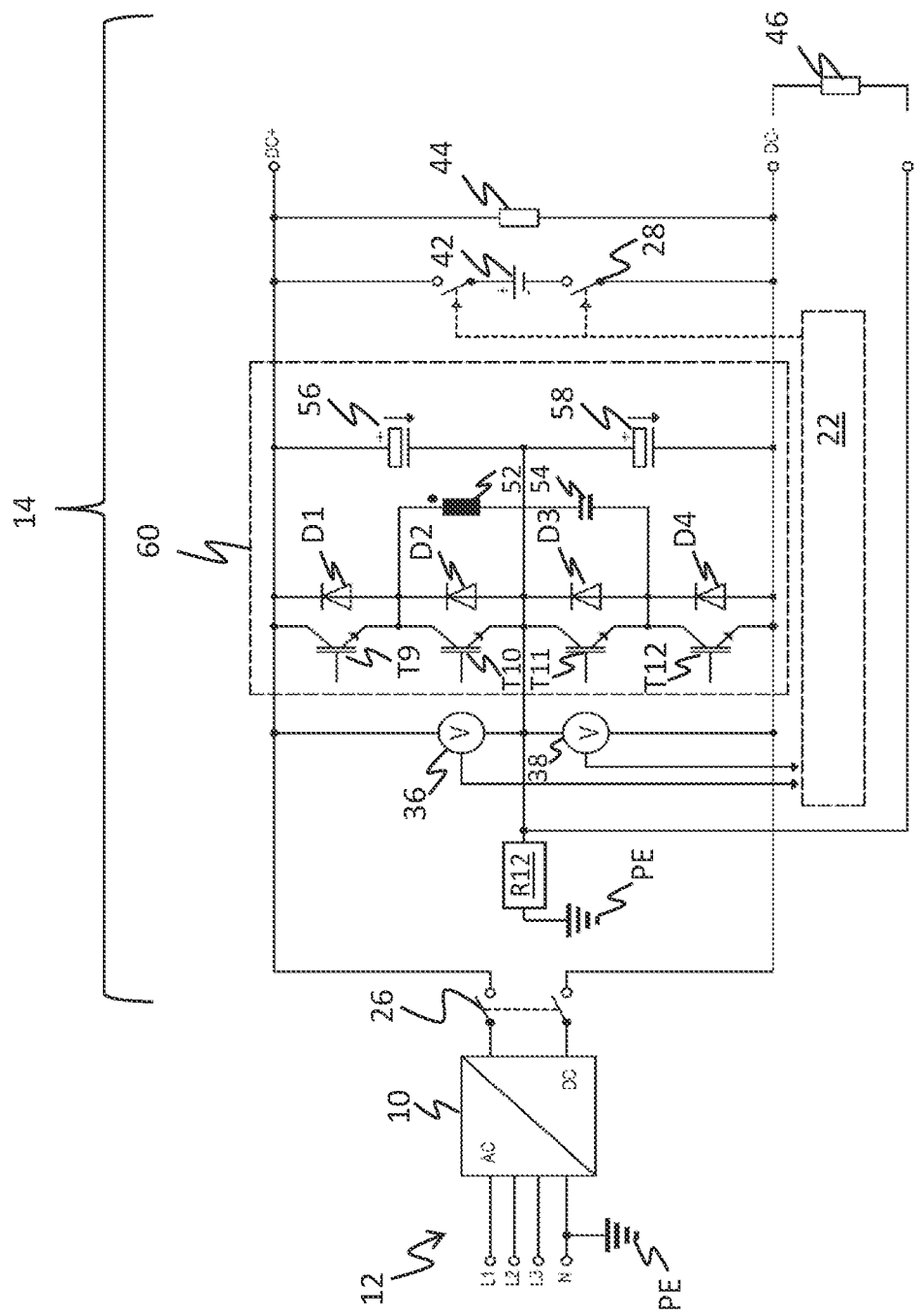
FIG. 7 schematically shows an electrical system comprising one embodiment of a balancing circuit with a charge pump.

FIG. 7 schematically illustrates one embodiment of the electrical system with switching transistors T9, T10, T11, T12. A three-phase AC supply grid 12 grounded at the ground potential PE is connected on the AC side of a power converter 10. A DC grid 14 is connected on the DC side. The DC grid 14 has a battery 42 and a load 44 that are connected between a first DC line or conductor DC+ and a second DC line or conductor DC−. The load 44 may, for example, comprise one or more consumers, such as, for example, a machine, an industrial plant, or even an electrolyser. The DC grid 14 is connectable to the power converter 10 via circuit breakers 26.

The balancing circuit or unit 60 comprises a first semiconductor switch T9 and a second semiconductor switch T12, which are connected in series between the first DC conductor and the second DC conductor DC+, DC−. Further semiconductor switches T10 and T11 are connected in series between the first semiconductor switch T9 and the second semiconductor switch T12. A connection to ground potential PE is arranged between the further semiconductor switches T10 and T11 via a resistor R12. A first voltmeter 36 is connected in parallel with the series connection of the semiconductor switches T9, T10. A second voltmeter 38 is connected in parallel with the series connection of the semiconductor switches T11, T12. A series connection of two capacitors 56, 58 with identical capacitance values in one embodiment is connected in parallel with the series connection of the semiconductor switches T9, T10, T11, T12. The center taps of the series connections of the semiconductor switches T9, T10, T11, T12 and of the capacitors 56, 58 are connected to one another and to the center tap between the voltmeters 36, 38. Both voltmeters 36, 38 are connected to the control unit 22. Respective diodes D1, D2, D3, D4 are connected in parallel with the semiconductor switches T9, T10, T11, T12.

The balancing circuit or unit 60 is configured such that at least semiconductor switch T9 with T10 or semiconductor switch T11 with T12 is operated such that, in the presence of an asymmetry in the voltages of the first DC conductor and the second DC conductor DC+, DC− to ground potential PE, a compensation current IA flows between at least one of the DC conductors DC+, DC− and ground potential PE via semiconductor switch T9 with T10 or T11 with T12. This is achieved in that the control circuit or unit 22 determines an asymmetry in the voltages using the voltmeters 36, 38 and, in the presence of an asymmetry in the DC voltages that is greater than the first threshold value TH1, drives the semiconductor switches T9 with T10 or T11 with T12 such that a conductive connection is established between one of the DC lines DC+, DC− and ground potential PE via the resistor R12. A compensation current IA flows through the conductive connection between one of the DC lines DC+, DC− and ground potential PE, as a result of which the asymmetry in the voltages of the first DC conductor and the second DC conductor DC+, DC− to ground potential PE is reduced or at least kept the same. In one embodiment, the voltages of the DC conductors DC+, DC− with respect to the ground potential PE may be balanced.

If the compensation current IA becomes so great that the second threshold value TH2 is reached, then the control circuit or unit 22 can detect this using the voltmeters 36, 38 and generate a switch-off signal. In the illustrated embodiment, the switch-off signal may act on the DC switches 28 and disconnect the battery 42 from the DC grid 14. As an alternative or in addition, the switch-off signal may act on the circuit breakers 26 and disconnect the power converter 10 from the DC grid 14. The supply of electric power to the DC grid 14 from the battery 42 and/or via the power converter 10 is thus switched off.

In one embodiment, the capacitors 56, 58 form a DC link circuit into which charge is pumped by a charge pump circuit. In FIG. 7, the charge pump circuit has a bridge circuit of the semiconductor switches T9, T10, T11, T12, which are supplemented by the coil 53 and the capacitor 54 to form a resonant circuit. Due to resonant operation, charge is pumped from a DC line DC+, DC− into the link circuit.

FIG. 8 illustrates example courses of compensation currents IA. The upper characteristic C1 shows one example of a course of the compensation current IA for the case of a balancing circuit or unit 60 with a control circuit or unit 22 that drives the semiconductor switches T9, T10, T11, T12, as shown, for example, in FIG. 7. The lower course C2 shows one example of a course of the compensation current IA for the case of a balancing circuit or unit 40 with a circuitry-based implementation of the method from FIG. 1, as shown, for example, in FIG. 4-6. Although the balancing circuit or unit 40 from FIG. 5 has a control circuit or unit, this drives the DC switches 28 for the switch-off in accordance with act S4. The threshold value TH1 is implemented in terms of circuitry via the Zener diode Z1 in FIG. 4 or Z2 in FIG. 5 or by way of the voltmeters 32, 34 in FIG. 6 or 36, 38 in FIG. 7.

Both courses C1, C2 share that the compensation current IA, provided that the asymmetry in the DC voltages is within TH1, is in the range of 0, that is to say no compensation current IA is generated. If the asymmetry in the DC voltages is outside the range of TH1, that is to say outside the range of the edges of the band TH1, then the compensation current IA increases rapidly in order to maintain the asymmetry in the range of TH1. If the absolute value of the compensation current IA then reaches the second threshold value TH2, then the switch-off signal for the DC grid 14 is generated, such that the compensation current IA accordingly does not continue to increase any further. In one embodiment, the upper characteristic C1 also exhibits hysteresis in the region at the edges of the band TH1, which is implemented, for example, by starting the driving of the semiconductor switches in the embodiment according to FIG. 7 when the asymmetry is slightly outside the band TH1, and stopping it only when the asymmetry is back within the band TH1. This avoids switching the driving of the semiconductors on and off in quick succession in the event of asymmetries at the edge of the band TH1.

The invention claimed is:

1. A method for balancing voltages on a first DC conductor and a second DC conductor in a DC grid using a balancing circuit with a first semiconductor switch and a second semiconductor switch, which are connected in series between the first DC conductor and the second DC conductor, and a connection to a ground potential that is arranged between the first semiconductor switch and the second semiconductor switch,
 wherein, when an asymmetry in voltages of the first DC conductor to ground potential and of the second DC conductor to ground potential is detected, generating a compensation current between at least one of the first DC conductor and the second DC conductor and ground potential via at least one of the first and second semiconductor switches, wherein the asymmetry in the voltages of the first DC conductor and the second DC conductor to ground potential is reduced and/or the voltages of the first DC conductor and the second DC conductor to ground potential are balanced by the compensation current,
 wherein the asymmetry in the voltages is determined by a control circuit,
 wherein the compensation current is generated via the first or second semiconductor switch when the asymmetry in the voltages exceeds a predefinable first threshold value; and
 monitoring a size of the compensation current by the control circuit and generating a switch-off signal and outputting the switch-off signal when a predefinable second threshold value is exceeded.

2. The method as claimed in claim 1, wherein the outputting of the switch-off signal disconnects the DC grid from an electrical energy store and/or a DC source.

3. A balancing circuit for a DC grid with a first DC conductor and a second DC conductor, wherein at least one DC load and an electrical energy store and/or a DC source are connected between the first DC conductor and the second DC conductor, comprising:
 a first semiconductor switch and a second semiconductor switch, which are connected in series between the first DC conductor and the second DC conductor, and
 a connection to ground potential arranged between the first semiconductor switch and the second semiconductor switch,
 wherein the balancing circuit is configured to operate at least one of the first and second semiconductor switches such that, in a presence of an asymmetry in voltages of the first DC conductor and the second DC conductor to ground potential, a compensation current flows between at least one of the first DC conductor and the second DC conductor and the ground potential via the at least one semiconductor switch, wherein the asymmetry in the voltages of the first DC conductor and the second DC conductor to ground potential is reduced and/or the voltages with respect to ground potential are balanced by the compensation current,
 wherein the compensation current is generated via the first or second semiconductor switch when the asymmetry in the voltages exceeds a predefinable first threshold value,
 a control circuit configured to monitor the asymmetry in the voltages,
 wherein the control circuit is configured to monitor a size of the compensation current and generate a switch-off signal and output the switch-off signal when a predefinable second threshold value is exceeded.

4. The balancing circuit as claimed in claim 3, wherein the first semiconductor switch and the second semiconductor switch comprise transistors.

5. The balancing circuit as claimed in claim 4, wherein control terminals of the transistors are connected to a center tap of a series connection of two ohmic resistors arranged between the first DC conductor and the second DC conductor.

6. The balancing circuit as claimed in claim 5, further comprising a Zener diode arranged between the center tap of the series-connected ohmic resistors and the control terminals of the transistors.

7. The balancing circuit as claimed in claim 6, further comprising an ammeter and, in series therewith, a further Zener diode arranged between the control terminals of the transistors and ground potential, wherein the control circuit uses the ammeter to detect a current flow through the further Zener diode and generate and output a switch-off signal when a current flows through the further Zener diode.

8. The balancing circuit as claimed in claim 7, wherein the control circuit is configured to drive the at least one semiconductor switch based on the asymmetry in the voltages.

9. The balancing circuit as claimed in claim 3, further comprising a first voltmeter arranged in parallel with the first semiconductor switch, and a second voltmeter arranged in parallel with the second semiconductor switch, wherein the first voltmeter is configured to measure a voltage of the first DC conductor to ground potential and the second voltmeter is configured to measure a voltage of the second DC conductor to ground potential.

10. The balancing circuit as claimed in claim 9, wherein the control circuit is configured to use the first voltmeter and the second voltmeter to monitor an asymmetry in the voltages of the first DC conductor to ground potential and of the second DC conductor to ground potential, respectively, and selectively generate and output the switch-off signal in response thereto.

11. The balancing circuit as claimed in claim 9, wherein the first semiconductor switch and the second semiconductor switch are part of a charge pump circuit that comprises a first series connection of four semiconductor switches, a second series connection of four diodes and a third series connection of two capacitors, wherein the first, second and third series connections are each connected between the first DC conductor and the second DC conductor and wherein center taps of the first, second and third series connections are connected to one another, and wherein the charge pump circuit comprises a resonant circuit comprising a coil and a capacitor.

12. The balancing circuit as claimed in claim 3, further comprising a further DC grid operated between a connection to ground potential arranged between the first semiconductor switch and the second semiconductor switch, and the first DC conductor or the second DC conductor.

13. A DC grid with a balancing circuit for the DC grid with a first DC conductor and a second DC conductor, wherein at least one DC load and an electrical energy store and/or a DC source are connected between the first DC conductor and the second DC conductor, wherein the balancing circuit comprises:
   a first semiconductor switch and a second semiconductor switch, which are connected in series between the first DC conductor and the second DC conductor, and
   a connection to ground potential arranged between the first semiconductor switch and the second semiconductor switch,
   wherein the balancing circuit is configured to operate the at least one of the first and second semiconductor switches such that, in a presence of an asymmetry in voltages of the first DC conductor and the second DC conductor to ground potential, a compensation current flows between at least one of the first DC conductor and the second DC conductor and the ground potential via the at least one semiconductor switch, wherein the asymmetry in the voltages of the first DC conductor and the second DC conductor to ground potential is reduced and/or the voltages with respect to ground potential are balanced by the compensation current,
   wherein the compensation current is generated via the first or second semiconductor switch when the asymmetry in the voltages exceeds a predefinable first threshold value,
   a control circuit configured to monitor the asymmetry in the voltages,
   wherein the control circuit is configured to monitor a size of the compensation current and generate a switch-off signal and output the switch-off signal when a predefinable second threshold value is exceeded.

14. The DC grid as claimed in claim 13, further comprising a power converter configured to transfer power between an AC side of the power converter and a DC side of the power converter, wherein the AC side of the power converter is connected to a grounded three-phase AC supply grid and the DC side of the power converter is connected to the DC grid.

15. A method for operating a DC grid comprising a first DC conductor and a second DC conductor, wherein at least one DC load and an electrical energy store and/or a DC source are connected between the first DC conductor and the second DC conductor, wherein the method comprises:
   balancing voltages on the first DC conductor and the second DC conductor using a balancing circuit comprising a series connection of a first semiconductor switch and a second semiconductor switch arranged between the first DC conductor and the second DC conductor and a connection to a ground potential arranged between the first semiconductor switch and the second semiconductor switch,
   determining an asymmetry in the voltages of the first DC conductor to ground potential and of the second DC conductor to ground potential using a control circuit,
   generating a compensation current between at least one of the first DC conductor and the second DC conductor and ground potential via at least one of the first and second semiconductor switches when the asymmetry in the voltages exceeds a predefinable first threshold value,
   wherein the asymmetry in the voltages of the first DC conductor and the second DC conductor to ground potential is reduced and/or the voltages of the first DC conductor and the second DC conductor to ground potential are balanced by the compensation current; and
   monitoring a size of the compensation current by the control circuit and generating a switch-off signal and outputting the switch-off signal when a predefinable second threshold value is exceeded.

* * * * *